United States Patent
Satake

(10) Patent No.: US 6,531,566 B1
(45) Date of Patent: Mar. 11, 2003

(54) POLYOXYALKYLENEPOLYOLS AND PROCESS FOR PRODUCING RING-OPENED POLYMER

(75) Inventor: Munekazu Satake, Kyoto (JP)

(73) Assignee: Sanyo Chemical Industries, Ltd., Kyoto (JP)

(*) Notice: Subject to any disclaimer, the term of this patent is extended or adjusted under 35 U.S.C. 154(b) by 0 days.

(21) Appl. No.: 09/743,353

(22) PCT Filed: Jul. 9, 1999

(86) PCT No.: PCT/JP99/03717

§ 371 (c)(1),
(2), (4) Date: Mar. 7, 2001

(87) PCT Pub. No.: WO00/02952

PCT Pub. Date: Jan. 20, 2000

(30) Foreign Application Priority Data

Jul. 10, 1998 (JP) ............................................. 10-211882
Mar. 30, 1999 (JP) ............................................. 11-088812

(51) Int. Cl.[7] ............................................. C08G 18/48
(52) U.S. Cl. ............................. 528/76; 568/10; 568/75; 568/620; 568/623; 528/77; 528/319; 528/323; 528/354; 528/357; 528/370; 528/371; 528/377; 528/378; 528/409; 528/410; 528/423; 528/424; 564/443; 564/505; 252/182.27
(58) Field of Search ................................ 568/623, 620, 568/10, 75; 528/76, 77, 416, 421, 409, 410, 423, 424, 319, 323, 357, 354, 370, 371, 377, 378; 564/505, 443; 252/182.27

(56) References Cited

U.S. PATENT DOCUMENTS 3,879,312 A * 4/1975 Udding et al.
4,962,237 A * 10/1990 Laycock
5,612,416 A * 3/1997 McCollum et al.
5,939,591 A * 8/1999 Birdwell et al.

FOREIGN PATENT DOCUMENTS

| EP | 0352819 | | 1/1990 |
|---|---|---|---|
| JP | 57-108120 | * | 7/1982 |
| JP | 2-247220 | * | 10/1990 |
| JP | 3-244632 | * | 10/1991 |
| JP | 4-300920 | * | 10/1992 |
| JP | 9-188754 | * | 7/1997 |

OTHER PUBLICATIONS

Okeneva et al.; Nature of Terminal Hydroxyl Groups of Alkylene Oxide Oligomers Obtained by Cationic Polymerization; Vysokomol. Soeden., Ser. A (1969), 11(6), 1279–84, (abstract).*

* cited by examiner

*Primary Examiner*—Rachel Gorr
(74) *Attorney, Agent, or Firm*—Connolly Bove Lodge & Hutz LLP

(57) ABSTRACT

A polyoxyalkylene polyol or monool (I) of the general formula (1) below, in which not less than 40% of the terminally located hydroxyl-containing groups, namely —AO—H groups, are primary hydroxyl-containing groups of the general formula (2) below, or;

a method of producing ring-opening polymerization products, by subjecting a heterocyclic compound to ring-opening addition polymerization with an active hydrogen-containing compound, using as a catalyst tris(pentafluorophenyl)borane, tris(pentafluorophenyl)aluminum, etc.

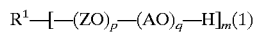

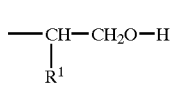

19 Claims, No Drawings

POLYOXYALKYLENEPOLYOLS AND PROCESS FOR PRODUCING RING-OPENED POLYMER

TECHNICAL FIELD

The present invention relates to polyoxyalkylene polyols or monools having the proportion of terminal primary hydroxyl groups of not less than 40%; to a method of preparing ring-opening polymerization products by ring-opening addition polymerization of a heterocyclic compound; and to polyol compositions for use as polyol components for polyurethane resins, epoxy resins and like thermosetting resins. More particularly, it relates to polyoxyalkylene polyols having increased reactivity with isocyanato groups or the like without impairing their hydrophobicity; to a method of effecting ring-opening polymerization of cyclic compounds in the presence of a specific catalyst; and to the use of said compounds as polyol components for thermosetting resins.

BACKGROUND ART

Polyols such as polyoxyalkylene polyols obtained by ring-opening reaction of a monoepoxide, such as an alkylene oxide, with an active hydrogen-containing compound are in wide use as starting materials for thermosetting resins such as polyurethanes, as surfactants, as lubricants and in other fields of application.

The method so far widely used for the production of polyethers comprises reacting a monoepoxide in the presence of an alkaline catalyst. Used as the alkaline catalyst are alkali metal compounds such as potassium hydroxide and sodium hydroxide. As an alternative, the method is also known which comprises carrying out the reaction of a monoepoxide using a $BF_3$ complex, zinc hexacyanocobaltate or a like composite metal cyanide complex as the catalyst.

Polyoxyalkylene polyols obtained by ring-opening reaction of an $\alpha,\beta$-epoxides such as propylene oxide, epichlorohydrin, styrene oxide or laurylene oxide in the presence of such catalyst have very low proportion of terminal primary hydroxyl groups (generally not more than 2% when potassium hydroxide is used, for instance), most of the terminal hydroxyl groups being secondary hydroxyl groups. Therefore, such polyols have insufficient reactivity for use as polyol components for thermosetting resins. For example, they have low reactivity with isocyanate groups in isocyanate-containing compounds (tolylene diisocyanate etc.) and have insufficient reactivity when they are used as polyol components for urethane resins.

For securing sufficient reactivity with isocyanate groups, the terminal hydroxyl groups is required to be primary hydroxyl groups. For this purpose, a method is known which comprises performing ring-opening reaction of alkylene oxides to obtain polyoxyalkylene polyols, and then subjecting ethylene oxide to ring-opening reaction therewith, thus generating terminal primary hydroxyl groups. However, since the polyethylene oxide portions are hydrophilic, such method reduces the hydrophobicity of polyoxyalkylene polyols. When such polyols are used, there arises a problem in that the physical and other characteristics of the resulting urethane resins vary widely depending on humidity.

On the other hand, for ring-opening polymerization of carbonates, thiocarbonates, dithiocarbonates and like cyclic compounds, a method has been used which comprises effecting ring-opening polymerization in the presence of an acid catalyst such as $BF_3$.

However, this method of producing ring-opening polymerization products, which comprises effecting ring-opening polymerization of carbonates, thiocarbonates, dithiocarbonates and like cyclic compounds in the presence of such a catalyst, has a problem in that carbon dioxide, carbon oxide sulfide, carbon disulfide or the like is eliminated during ring-opening addition polymerization of such cyclic compounds, leading to low yields of the ring-opening polymerization products derived from the cyclic compounds. In addition, in the step of ring-opening polymerization, such a catalyst must be used in an amount almost equivalent to growing chain terminals, so that a large quantity of the catalyst remains in the polymers produced. In certain fields of application of the ring-opening polymerization products thus obtained, the residual catalyst has significant adverse effects, hence it is necessary to remove the catalyst by treatment following the ring-opening polymerization.

In view of the foregoing, the present invention has its object to provide polyol compositions having sufficient reactivity for use as materials for thermosetting resins without impairing the hydrophobicity of polyoxyalkylene polyols; polyoxyalkylene polyols suited for use in this polyol compositions; a method of producing this polyoxyalkylene polyols; and a method of producing ring-opening polymerization products by subjecting a cyclic compound to ring-opening addition polymerization in the presence of a specific catalyst.

SUMMARY OF INVENTION

The present inventors made intensive investigations in an attempt to solve the above problems and, as a result, found that:

(1) polyoxyalkylene polyols having the proportion of terminal primary hydroxyl groups of not less than 40% have sufficient reactivity as polyol components for thermosetting resins while retaining the hydrophobicity thereof;

(2) such polyoxyalkylene polyols having the proportion of terminal primary hydroxyl groups of not less than 40% can be obtained by adding an epoxy containing compound to an active hydrogen-containing compound in the presence of a catalyst having a specific chemical structure and;

(3) the yield is very high when a cyclic compound is subjected to ring-opening addition polymerization in the presence of a specific catalyst. These findings have now led to completion of the present invention.

Thus, the present invention consists in polyoxyalkylene polyols or monools (I) of the general formula (1) below, characterized in that not less than 40% of the terminally located hydroxyl-containing groups, namely —AO—H groups, are primary hydroxyl-containing groups of the general formula (2) below:

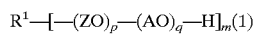

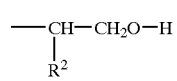

wherein:

in the formula (1), $R^1$ is a group having a valence of m as derived from a compound selected from the group consisting of water, an alcohol compound, a phenol compound, an amino-containing compound, a carboxyl-containing compound, a thiol-containing compound and a phosphoric acid compound by removal of its active hydrogen atom or atoms; Z is an alkylene group containing 2 to 12 carbon atoms or a cycloalkylene group containing 6 to 12 carbon atoms, each of which may contain at least one halogen atom or aryl group or both as substituents; A is an alkylene group containing 3 to 12 carbon atoms or a cycloalkylene group containing 6 to 12 carbon atoms, each of which may contain at least one halogen atom or aryl group or both as substituents; m is an integer of 1 or 2 to 100; p is an integer of 0 or 1 or more and q is an integer of 1 or more, p+q being equal to 1 to 200; and in the formula (2), $R^2$ is an alkyl group containing 1 to 10 carbon atoms or an aryl group containing 6 to 10 carbon atoms, each of which may be substituted by a halogen atom or atoms.

The present invention also consists in a method of producing ring-opening polymerization products, which comprises subjecting a heterocyclic compound (d) of the general formula (5) below to ring-opening addition polymerization with an active hydrogen-containing compound (b) of the general formula (3) below in the presence of at least one catalyst (c) selected from the group consisting of compounds having the general formula (4–1) below, compounds of the general formula (4–2) below and compounds of the general formula (4–3) below:

$$R^1\text{—}[\text{—}(ZO)_p\text{—}H]_m \tag{3}$$

$$X\text{—}(\text{—}R^3)_2 \tag{4-1}$$

(4-2)

(4-3)

(5)

wherein:

in the formula (3), $R^1$ is a group having a valence of m as derived from a compound selected from the group consisting of water, an alcohol compound, a phenol compound, an amino-containing compound, a carboxyl-containing compound, a thiol-containing compound and a phosphoric acid compound by removal of its active hydrogen atom or atoms; Z is an alkylene group containing 2 to 12 carbon atoms or a cycloalkylene group containing 6 to 12 carbon atoms, each of which may contain at least one halogen atom or aryl group or both as substituents; m is an integer of 1 or 2 to 100; and p is an integer of 0 or 1 to 199;

in each of the formulae (4-1), (4-2) and (4-3), X represents a boron atom or aluminum atom; F represents a fluorine atom; and $R^3$ represents a substituted or unsubstituted phenyl group of the general formula (6) below and/or a tertiary alkyl group of the general formula (7) below;

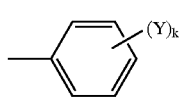
(6)

wherein, in the formula (6), Y represents a hydrogen atom, an alkyl group containing 1 to 4 carbon atoms, a halogen atom, a vitro group or a cyano group; and k represents an integer of 0 to 5, provided that when k is 2 or more, a plurality of Y groups may be the same or different;

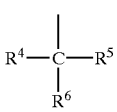
(7)

wherein $R^4$ $R^5$ and $R^6$ each independently represents an alkyl group containing 1 to 4 carbon atoms and when there are a plurality of $R^1$ groups, they may be the same or different.

in the formula (5), R is an alkylene group containing 3 to 12 carbon atoms, which may contain at least one halogen atom or aryl group or both as substituents; Q is a divalent organic group selected from the group consisting of —O—, —S—, —NH—, —O(CO)O—, S(CO)O—, —O(CS)O—, —O(CO) S—, —O(CS)S—, —S(CS)O——S(CO)S—, —S(CO)S—, —COO—, —CSO—, —COS—, —CSS—, —CONN— and —N=C(—$R^7$)—O—in which $R^7$ represents an alkyl group containing 1 to 12 carbon atoms, a cycloalkyl group containing 1 to 12 carbon atoms, which may be substituted by an alkyl group, or an aryl group containing 1 to 12 carbon atoms, which may be substituted by a halogen atom.

The present invention further consists in:

polyol compositions (III) for the production of thermosetting resins, which comprise the above polyoxyalkylene polyols or monools (I);

ring-opening polymerization products produced by the production method mentioned above;

in particular, polyol compositions (II) for the production of thermosetting resins, which comprise said ring-opening polymerization products, and;

a method of producing polyurethane resins by reacting polyol components and polyisocyanates (e) in which said polyol compositions (II) or (III) are used as the polyol components.

DETAILED DESCRIPTION OF THE INVENTION

According to its first aspect, the present invention is concerned with polyoxyalkylene polyols or monools (I) of the above general formula (1), in which not less than 40% of terminally located hydroxyl-containing groups, namely —AO—H groups, are primary hydroxyl-containing groups of the above general formula (2).

In the formula (1), $R^1$ is a group having a valence of m as derived from a compound selected from the group consisting of water, an alcohol compound, a phenol compound, an amino-containing compound, a carboxyl-containing compound, a thiol-containing compound and a phosphoric acid compound by removal of its active hydrogen atom or atoms, and m is an integer of 1 (monools) or 2 to 100 (polyols).

$R^1$ may be a group derived from a compound (a) having m active hydrogen atoms) by removal of said active hydrogen atom(s). As such compound (a), there may be mentioned for example hydroxyl-containing compounds, amino-containing compounds, carboxyl-containing compounds, thiol-containing compounds, phosphoric acid compounds; compounds having two or more active hydrogen-containing functional groups within one molecule; and mixtures of two or more of these compounds.

As said hydroxyl-containing compounds, there may be mentioned, among others, water, monohydric alcohols, polyhydric (dihydric to octahydric) alcohols, phenols and polyphenols. More specifically, there may be mentioned monohydric alcohols such as methanol, ethanol, butanol and octanol; dihydric alcohols such as ethylene glycol, propylene glycol, 1,1-butylene glycol, 1,1-butanediol, 1,6-hexanediol, 3-methylpentanediol, diethylene glycol, neopentyl glycol, 1,4-bis(hydroxymethyl)cyclohexane, 1,4-bis(hydroxyethyl)benzene and 2,2-bis(4,4'-hydroxycyclohexyl)propane; trihydric alcohols such as glycerol and trimethylolpropane; tetra- to octa-hydric alcohols such as pentaerythritol, diglycerol, α-methylglucoside, sorbitol, xylitol, mannitol, dipentaerythritol, glucose, fructose and sucrose; phenols such as phenol and cresol; polyphenols such as pyrogallol, catechol and hydroquinone; bisphenols such as bisphenol A, bisphenol F and bisphenol S; polybutadiene polyols; castor oil-derived polyols; and polyfunctional polyols (e.g. with two to 100 functional groups) such as hydroxyalkyl (meth)acrylate (co)polymers and poly vinyl alcohol)s, among others.

As said amino-containing compounds, there may be mentioned, for example, amines, polyamines, amino alcohols and the like. More specifically, there may be mentioned ammonia; monoamines such as alkylamines containing 1 to 20 carbon atoms (e.g., butylamine) and aniline; aliphatic polyamines such as ethylenediamine, trimethylenediamine, hexamethylenediamine and diethylenetriamine; heterocyclic polyamines such as piperazine and N-aminoethylpiperazine; alicyclic polyamines such as dicyclohexylmethanediamine and isophoronediamine; aromatic polyamines such as phenylenediamine, tolylenediamine, diethyltolylenediamine, xylylenediamine, diphenylmethanediamine, diphenyl ether diamine and polyphenylmethanepolyamine; alkanolamines such as monoethanolamine, diethanolamine, triethanolamine and triisopropanolamine; polyamide polyamines obtained by condensation of a dicarboxylic acid and an excess of a polyamine; polyether polyamines; hydrazines (hydrazine, monoalkylhydrazines, etc.), dihydrazides (succinic dihydrazide, adipic dihydrazide, isophthalic dihydrazide, terephthalic dihydrazide, etc.), guanidines (butylguanidine, 1-cyanoguanidine, etc.); dicyandiamide and the like; and mixtures of two or more of these.

As said carboxyl-containing compounds, there may be mentioned aliphatic monocarboxylic acids such as acetic acid and propionic acid; aromatic monocarboxylic acids such as benzoic acid; aliphatic polycarboxylic acids such as succinic acid and adipic acid; aromatic polycarboxylic acids such as phthalic acid, terephthalic acid and trimellitic acid; and polycarboxylic acid polymers (with 2 to 100 functional groups) such as acrylic acid (co)polymers, among others.

As said thiol-containing compounds, typically polythiol compounds, there may be mentioned, among others, divalent to octavalent polythiols. More specifically, there may be mentioned ethylene dithiol, propylene dithiol, 1,3-butylene dithiol, 1,4-butanedithiol, 1,6-hexanedithiol, 3-methylpentanedithiol and the like.

As said phosphoric acid compounds, there may be mentioned phosphoric acid, phosphorous acid and phosphoric acids.

Among these active hydrogen-containing compounds (a), hydroxyl-containing compounds, amino-containing compounds and water are preferred, among which alcohols and amines are more preferred.

In the above formula (1), Z is an alkylene group containing 2 to 12 carbon atoms or a cycloalkylene group containing 6 to 12 carbon atoms, and may contain at least one halogen atom or aryl group or both as substituents. More specifically, there may be mentioned, among others, ethylene, propylene, butylene, chloropropylene bromopropylene, laurylene, phenylethylene, chlorophenylethylene, 1,1-cyclohexylene and the like, and combinations of two or more of these. Preferred among them are propylene, butylene and ethylene groups and particularly preferred are propylene and butylene groups. When consideration is given to the maintenance of the hydrophobicity of the product polyoxyalkylene polyols or monools (I), the use of propylene, butylene or the like group or the combined use of ethylene and another alkylene group is recommended.

In the above formula (1), A is an alkylene group containing 3 to 12 carbon atoms or a cycloalkylene group containing 6 to 12 carbon atoms, and may contain at least one halogen atom or aryl group or both as substituents. More specifically, there may be mentioned for example propylene, butylene, chloropropylene, bromopropylene, laurylene, phenylethylene, chlorophenylethylene, 1,2-cyclohexylene and the like, and combinations of two or more of these. When ethylene group is used, it is preferably used in combination with another alkylene group from the viewpoint of the hydrophobicity of the resulting polyoxyalkylene polyols or monools (I).

In the present invention, the —AO—H groups, which are terminally located hydroxyl-containing groups among groups of —(AO)$_q$—H in the above general formula (1), include two types, namely primary hydroxyl-containing groups of the above general formula (2) and secondary hydroxyl-containing groups of the general formula (2') given below. The polyoxyalkylene polyols or monools (I) according to the first aspect of the present invention are characterized in that the content of the primary hydroxyl-containing groups of the above general formula (2) is not less than 40% preferably not less than 60%, relative to the total sum of terminal hydroxyl groups in the polyoxyalkylene polyols or monools (I).

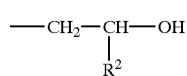

(2')

In the above formulae (2) and (2'), $R^2$ represents an alkyl group containing 1 to 10 carbon atoms or an aryl group containing 6 to 10 carbon atoms, each of which may be substituted by a halogen atom or atoms. More specifically, there may be mentioned for example linear alkyl groups such as methyl, ethyl and propyl; branched alkyl groups such as isopropyl; phenyl and substituted phenyl groups such as p-methylphenyl; substituted alkyl groups such as chloromethyl, bromomethyl, chloroethyl and bromoethyl; substituted phenyl groups such as p-chlorophenyl and p-bromophenyl, and combinations of two or more of these.

The subscript p is an integer of 0 or 1 or more, and q is an integer of 1 or more, the sum p+q being 1 to 200. Generally, p is an integer of 0 to 199, preferably 0 to 100, q is generally an integer of 1 to 200, preferably 1 to 100, and p+q is preferably 1 to 100.

The polyoxyalkylene polyols or monools (I) of the present invention generally have a number average molecular weight of 400 to 100,000, preferably 400 to 20,000. This molecular weight is adequately selected according to the field of use, for example according to the physical characteristics required of thermosetting resins such as polyurethane resins to be produced therefrom.

As specific examples of the polyoxyalkylene polyols (I-1) or monools (I-2), there may be mentioned for example water-derived propylene oxide adducts, methanol derived propylene oxide adducts, glycerol-derived propylene oxide adducts, ammonia-derived propylene oxide adducts, water-derived butylene oxide adduct-derived propylene oxide adducts, methanol-derived butylene oxide adduct-derived propylene oxide adducts, glycerol-derived butylene oxide adduct-derived propylene oxide adducts, ammonia-derived butylene oxide adduct-derived propylene oxide adducts, and the like.

As mentioned hereinabove, the proportion of primary hydroxyl-containing groups of the above general formula (2) relative to the total hydroxyl groups located terminally in the polyoxyalkylene polyols or monools (I) of the present invention (in the present specification, said proportion is also referred to as "proportion of terminal primary hydroxyl groups") is not less than 40% When it is less than 40%, the reactivity is insufficient for use as polyol components. Preferably, said proportion is not less than 60%. This proportion of terminal primary hydroxyl groups is calculated based on the data obtained by $^1$H-NMR measurement following pretreatment of the sample, i.e. esterification.

An example of said $^1$H-NMR measurement is specifically described in the following.

Sample preparation

About 30 mg of the sample is weighed in a sample tube for NMR with 5-mm diameter, and about 0.5 ml of deuterated solvent is added to dissolve the sample. Then, about 0.1 ml of trifluoroacetic anhydride is added and the resulting solution is used as a sample for analysis. Said deuterated solvent is, for example, deuterated chloroform, deuterated toluene, deuterated dimethyl sulfoxide, deuterated dimethylformamide or the like and a suitable one is selected so that the sample can be dissolved therein.

NMR measurement

Their $^1$H-NMR measurements are carried out under ordinary conditions.

Calculation of the proportion of terminal primary hydroxyl groups

Upon the above-mentioned pretreatment, the terminal hydroxyl groups of the sample polyoxyalkylene polyol react with the trifluoroacetic anhydride added to form trifluoroacetate ester derivatives. As a result, a signal from a primary hydroxyl-bound methylene group is observed at about 4.3 ppm while a secondary hydroxyl-bound methylene group gives a signal at about 5.2 ppm. The proportion of terminal primary hydroxyl groups is calculated according to the equation below:

Proportion of terminal primary hydroxyl groups $(\%) = [a + 2 \times b)] \times 100$ wherein a is the integral value for the signal at about 4.3 ppm from primary hydroxyl-bound methylene groups; and b is the integral value for the signal at about 5.2 ppm from secondary hydroxyl-bound methylene groups.

The active hydrogen-containing compound (b) to be used in the method of producing ring-opening polymerization products according to the present invention is represented by the above general formula (3). In the general formula (3), $R^1$ is as defined above and, as examples thereof, those mentioned above can be recited.

In the general formula (3), Z is an alkylene group containing 2 to 12 carbon atoms or a cycloalkylene group containing 6 to 12 carbon atoms and may contain at least one halogen atom or aryl group or both as substituents. As for Z, too, those recited above may be mentioned as examples thereof.

In the formula (3), p is an integer of 0 or 1 to 199, preferably an integer of 0 to 100. And m is an integer of 1 or 2 to 100.

As specific examples of the active hydrogen-containing compound (b) in which p is 0, there may be mentioned for instance the same ones as recited above in relation to the first aspect of the present invention, as the compound (a) having m active hydrogen(s).

When p is 1 or more, there may be mentioned, among others, compounds derived from said compound in which p is 0, namely the compound (a) having m active hydrogen atoms, by addition reaction of an alkylene oxide containing 2 to 12 carbon atoms; for example addition products of propylene oxide, butylene oxide or the like to hydroxyl-containing compounds, amino-containing compounds and the like. As specific examples, there may be mentioned water-derived propylene oxide adducts (polyoxypropylene glycol), methanol-derived propylene oxide adducts, glycerol-derived propylene oxide adducts, water-derived butylene oxide adducts, methanol-derived butylene oxide adducts, glycerol-derived butylene oxide adducts, ammonia-derived propylene oxide adducts and ammonia-derived butylene oxide adducts, among others.

Said catalyst (c) is a compound represented by either the above general formula (4-1), (4-2) or (4-3). This catalyst can be used for ring-opening addition polymerization of cyclic ether compounds, carbonates, dithiocarbonates and like heterocyclic compounds, to thereby obtain ring-opening polymerization products in good yields. In particular this can be used for ring-opening addition polymerization of epoxy-containing compounds, thus obtaining polyoxyalkylene polyols with high proportion of terminal primary hydroxyl groups, which has so far never been attained.

In each of the above formulae (4-1), (4-2) and (4-3), X represents a boron atom or aluminum atom and is preferably a boron atom.

In formulae (4-1), (4-2) and (4-3), $R^3$ represents the substituted or unsubstituted phenyl group of the above general formula (6) or the tertiary alkyl group of the above general formula (7), When there are a plurality of $R^1$ groups, they may be the same or different.

In the above general formula (6), Y represents a hydrogen atom, an alkyl group containing 1 to 4 carbon atoms, a halogen atom, a nitro group or a cyano group. Preferred among these are a hydrogen atom, a halogen atom and a cyano group. More preferred are a halogen atom and a cyano group.

The subscripts k represents an integer of 0 to 5.

As specific examples of the phenyl or substituted phenyl group of the above general formula (6), there may be mentioned phenyl, pentafluorophenyl, p-methylphenyl, p-cyanophenyl and p-nitrophenyl, among others. Preferred are phenyl, pentafluorophenyl and p-cyanophenyl and more preferred are phenyl and pentafluorophenyl.

$R^4$, $R^5$ and $R^6$ in the above general formula (7) each independently represents an alkyl group containing 1 to 4 carbon atoms. Specifically, there may be mentioned methyl, ethyl, propyl and isopropyl, among others.

As specific examples of the above tertiary alkyl group of the general formula (7), there may be mentioned t-butyl and t-pentyl, among others.

In the present invention, said catalyst (c) specifically includes, among others, triphenylborane, diphenyl-t-butylborane, tri(t-butyl borane, triphenylaluminum, diphenyl-t-butylaluminum, tri(t-butyl)aluminum, tris(pentafluorophenyl)borane, bis(pentafluorophenyl)-t-butylborane, tris(pentafluorophenyl)aluminum, bis (pentafluorophenyl)-t-butylaluminum, bis (pentafluorophenyl)fluoroborane, di(t-butyl)fluoroborane, (pentafluorophenyl)difluoroborane, (t-butyl)difluoroborane, bis(pentafluoro-phenyl)fluoroaluminum, di (t-butyl) fluoroaluminum, (pentafluorophenyl)difluoroaluminum, (t-butyl)difluoroaluminum and the like. Preferred are triphenylborane, triphenylaluminum, tris (pentafluorophenyl)borane and tris(pentafluorophenyl) aluminum and more preferred are tris(pentafluorophenyl) borane and tris(pentafluorophenyl)aluminum.

The heterocyclic compound (d) to be subjected to addition reaction according to the present invention is represented by the above general formula (5). As specific examples of said heterocyclic compound (d), there may be mentioned, among others, cyclic ethers, such as ethylene oxide, propylene oxide, butylene oxide, styrene oxide, oxetane and tetrahydrofuran; cyclic thioethers, such as ethylene sulfide; imines, such as ethyleneimine; cyclic carbonates, such as ethylene carbonate; cyclic thiocarbonates, such as ethylene thiocarbonate; cyclic dithiocarbonates, such as ethylene dithiocarbonate; cyclic lactones, such as ε-caprolactone; and cyclic lactams, such as ε-caprolactam.

The molar value of the heterocyclic compound (d), which is to be subjected to addition reaction to the active hydrogen-containing compound (b) in the presence of the catalyst (c) to give a ring-opening polymerization product, is generally 1 to 200 moles, preferably 1 to 100 moles, per active hydrogen in the active hydrogen-containing compound (b). It is to be adequately selected according to the molecular weight of the ring-opening polymerization product to be prepared and to the intended use thereof.

The level of the catalyst (c) added is not critical but generally is 0.0001 to 10% by weight, preferably 0.001 to 1% by weight, relative to the ring-opening polymerization product to be produced.

It is advantageous to employ the catalyst (c) having a specific chemical structure with high steric hindrance as specified by the present invention, because this enables to reduce the quantity of catalyst very drastically as compared with the conventional alkali metal hydroxide and other alkali catalysts (generally used in an amount of 0.1 to 10% by weight).

In subjecting the heterocyclic compound (d) to addition reaction, all the three, namely the active hydrogen-containing compound (b), heterocyclic compound (d) and catalyst (c), may be charged at once, or the heterocyclic compound (d) may be added dropwise to a mixture of the active hydrogen-containing compound (b) and catalyst (c) to thereby effect the reaction, or the heterocyclic compound (d) and catalyst (c) may be added dropwise to the active hydrogen-containing compound (b) to thereby effect the reaction.

From the viewpoint of reaction temperature control, preferred is the method comprising adding the heterocyclic compound (d) dropwise to a mixture of the active hydrogen-containing compound (b) and catalyst (c), or adding the heterocyclic compound (d) and catalyst (c) dropwise to the active hydrogen-containing compound (b).

The reaction temperature at which the heterocyclic compound (d) is subjected to addition reaction to the active hydrogen-containing compound (b) is generally 0° C. to 250° C., preferably 20° C. to 180° C.

The ring-opening polymerization products prepared by the production method of the present invention generally have a number average molecular weight of 75 to 100,000, preferably 900 to 20,000. Said molecular weight is selected so that it may be suited for the intended use:. For instance, when thermosetting resins, for example polyurethane resins, is to be produced using polyol compositions comprising the polyoxyalkylene polyols as said ring-opening polymerization product, it is judiciously selected according to the physical characteristics required of the polyurethane resins.

The thus produced ring-opening polymerization product contains the catalyst (c). According to the use thereof, it may be treated to remove the catalyst (c).

The method of its removal treatment comprises adsorption treatment using an adsorbent such as a synthetic silicate (magnesium silicate, aluminum silicate or the like) or activated clay, or neutralization with a basic compound, for instance.

Even if remaining in the ring-opening polymerization product, the catalyst (c) of the present invention does not have any significant adverse effect on the reactivity of the polyol and isocyanate in the subsequent urethane formation reaction, for instance, as compared with the alkali catalysts in conventional use. From the viewpoint of coloration prevention, however, it is preferred that the residual catalyst be removed.

In particular when ring-opening polymerization products are prepared by subjecting heterocyclic compounds of the above general formula (5) in which Q is —O— and R is a divalent hydrocarbon group of the general formula (8) below, namely epoxy-containing compounds, to addition reaction to the active hydrogen-containing compound (b) in the presence of the catalyst (c) according to the present invention, the resulting polymers have a further marked structural characteristic, namely a proportion of terminal primary hydroxyl groups of not less than 40% and advantageously not less than 60%.

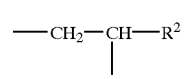

(8)

In the above formula, $R^2$ represents a monovalent hydrocarbon group containing 1 to 10 carbon atoms, which may be substituted by a halogen atom or atoms.

As specific examples of the above-mentioned epoxy-containing compounds, there may be mentioned propylene oxide, butylene oxide, laurylene oxide, epichlorohydrin, styrene oxide and the like. Two or more of these may be used in combination. Preferred among these are propylene oxide, butylene oxide, epichlorohydrin and styrene oxide.

According to its third aspect, the present invention consists in:

a polyol composition (III) for producing thermosetting resins, characterized by comprising the polyoxyalkylene polyol or monool (I) according to the first aspect of the present invention, or;

a polyol composition (II) for producing thermosetting resins, comprising the ring-opening polymerization product obtained according to the second aspect of the present invention. According to its fourth aspect, the present invention consists in a thermosetting resin characterized in that it is derived from said polyol composition (III) and/or said polyol composition (II). As said thermosetting resin, there may be mentioned polyurethane resins and epoxy resins, among others.

The polyurethane resin of the present invention is obtained by reacting the polyol composition (III) and/or polyol composition (II) with an aromatic isocyanate and/or aliphatic isocyanate (e), if necessary in combination with another polyol component, namely a low-molecular active hydrogen-containing compound (e.g. any of those mentioned as examples of the active hydrogen-containing compound in relation to the first aspect of the present invention).

By using, as the polyol components of polyurethane resins, the polyol composition (III) and/or polyol composition (II), which contains the polyoxyalkylene polyol (I) of the present invention as essential component, characteristic features are introduced that said polyol component is hydrophobic and highly reactive with isocyanate compounds.

Thus, urethane resins derived from the polyol composition (III) and/or polyol composition (II) of the present invention are characterized in that the reactivity with isocyanates is high in the step of production thereof, and that the humidity dependency of resin characteristics (tensile strength, elongation at break, bending strength, etc.) is low.

Furthermore, when such urethane resins are used as coating compositions, they have characteristic features that they are excellent in adhesion to polyolefin rubbers and polyolefin resins, for instance.

Said urethane resins can be used in various forms, such as urethane foams, urethane elastomers, urethane coating compositions and so on. As applications of urethane foams, there may be mentioned cushion materials for automobiles, backing materials for automobiles, and the like, and, as applications of the urethane elastomers, there may be mentioned casting potting materials and the like. As applications of the coating compositions, there may be mentioned adhesive or coating compositions or the like.

BEST MODES FOR CARRYING OUT THE INVENTION

The following examples further illustrate the present invention. They are, however, by no means limitative of the scope of the present invention.

EXAMPLE 1

A 200-ml SUS autoclave equipped with a stirrer and temperature control device was charged with 58.1 g of glycerol-propylene oxide adduct with a molecular weight of 1,000 (Sannix GP-1000, product of Sanyo Chemical Industries) and 0.97 g of tris(pentafluorophenyl)borane. Then, 110.1 g of propylene oxide was added dropwise over 12 hours at a reaction temperature of 70–80° C. Thereafter, the mixture was matured at 75° C. for 6 hours and then neutralized with an aqueous solution of sodium hydroxide. Then, 3.0 g of synthetic silicate salt (Kyowaad 600, product of Kyowa Chemical) and water were added, and the mixture was treated at 60° C. for 3 hours. The mixture was taken out of the autoclave, filtered through a 1-micron filter and then dehydrated, to give 161.3 g of liquid-form polyoxypropylenetriol (molecular weight: 3,000). The yield was 97% as calculated based on the weight of glycerol-propylene oxide adduct plus propylene oxide charged. The polyoxypropylenetriol obtained had a hydroxyl value of 56.1.

The results of $^1$H-NMR chemical shift measurement in terms of δ values of the polyoxypropylenetriol obtained (solvent: CDCl$_3$) are shown below. $^1$H-NMR, δ values: 1.11 (s, 150.4H), 2.5 (s, 3H), 3.20–3.79 (m, 155.4H)

The proportion of terminal primary hydroxyl groups was determined by the $^1$H-NMR method described hereinabove and found to be 74%.

The measurement results for $^1$H-NMR chemical shift δ values (solvent: CDCl$_3$) as obtained on that occasion are shown below.
$^1$H-NMR δ values: 1.13 (s, 150.4H), 3.38–3.83 (m, 153.1H), 9.20–4.39 (m, 4.5H), 5.16–5.30 (m, 0.8H)

EXAMPLE 2

A 200-ml SUS autoclave equipped with a stirrer and temperature control device was charged with 58.1 g of glycerol-propylene oxide adduct with a molecular weight of 1,000 (Sannix GP-1000, product of Sanyo Chemical Industries). Thereto was added dropwise 110.13 g of propylene oxide and 0.0008 g of tris(pentafluorophenyl)borane over 12 hours at a reaction temperature of 714 80° C., and the resulting mixture was matured at 75° C. for 6 hours. Then, 3.0 g of synthetic silicate salt (Kyowaad 1000, product of Kyowa Chemical) and water were added, and the mixture was treated at 60° C. for 3 hours. The mixture was taken out of the autoclave, filtered through a 1-micron filter and then dehydrated, to give 161.3 g of liquid-form polyoxypropylenetriol (molecular weight: 3,000). The yield was 97%. The polyoxypropylenetriol obtained had a hydroxyl value of 56.1.

The results of $^1$H-NMR chemical shift measurement in terms of δ values of the polyoxypropylenetriol obtained (solvent: CDCl$_3$) are shown below.
$^1$H-NMR δ values: 1.11 (s, 150.9H), 2.5 (s, 3H), 3.20–3.79 (m, 155.4H)

The proportion of terminal primary hydroxyl groups was determined by the $^1$H-NMR method described hereinabove and found to be 75%.

The measurement results for $^1$H-NMR chemical shift δ values (solvent: CDCl$_3$) as obtained on that occasion are shown below.
$^1$H-NMR, δ values: 1.13 (s, 150.4H), 3.38–3.83 (m, 153.1H), 4.20–4.39 (m, 4.5H), 5.1–5.30 (m, 0.8H)

EXAMPLE 3

The procedure of Example 1 was followed in the same manner except that 87,1 g of glycerol-propylene oxide adduct with a molecular weight of 3,000 (Sannix GP-3000, product of Sanyo Chemical Industries) was used in lieu of the glycerol-propylene oxide adduct with a molecular weight of 1,000, and that tris(pentafluorophenyl)borane and propylene oxide were used in an amount of 0.97 g and 87.1 g, to give 169.0 g of liquid-form polyoxypropylenetriol (molecular weight: 6,000). The yield was 97%. The polyoxypropylenetriol obtained had a hydroxyl value of 28.1.

The results of $^1$H-NMR chemical shift measurement in terms of δ values of the polyoxypropylenetriol obtained (solvent: CDCl$_3$) are shown below.
$^1$H-NMR, δ values: 1.11 (s, 305.6H), 2.5 (s, 3H), 3.20–3.79 (m, 310.6H)

The proportion of terminal primary hydroxyl groups was determined by the $^1$H-NMR method described hereinabove and found to be 74%.

The measurement results for $^1$H-NMR chemical shift δ values (solvent: CDCl$_3$) as obtained on that occasion are shown below.
$^1$H-NMR δ values: 1.13 (s, 305.6H), 3.38–3.83 (m, 308.3H), 4.20–9.34 (m, 4.5H), 5.16–5.30 (m, 0.8H)

EXAMPLE 4

The procedure of Example 2 was followed in the same manner except that 87.1 g of glycerol-propylene oxide adduct with a molecular weight of 3,000 (Sannix GP-3000, product of Sanyo Chemical Industries) was used in lieu of the glycerol-propylene oxide adduct with a molecular weight of 1,000, and that propylene oxide and tris (pentafluorophenyl)borane were used in an amount of 87.1 g and 0.0009 g, to give 169.0 g of liquid-form polyoxypropylenetriol (molecular weight: 6,000). The yield was 97%. The polyoxypropylenetriol obtained had a hydroxyl value of 28.1.

The results of $^1$H-NMR chemical shift measurement in terms of δ values of the polyoxypropylenetriol obtained (solvent: CDCl$_3$) are shown below.

$^1$H-NMR, δ values: 1.11 (s, 305.6H), 2.5 (s, 3H), 3.20–3.79 (m, 310.6H)

The proportion of terminal primary hydroxyl groups was determined by the $^1$H-NMR method described hereinabove and found to be 74%.

The measurement results for $^1$H-NMR chemical shift δ values (solvent: CDCl$_3$) as obtained on that occasion are shown below.

$^1$H-NMR, δ values: 1.13 (s, 305.6H), 3.38–3.83 (m, 308.3H), 4.20–4.39 (m, 4.5H), 5.16–5.30 (m, 0.8H)

EXAMPLE 5

The procedure of Example 2 was followed in the same manner except that 87.1 g of polypropylene glycol with a molecular weight of 1,000 (Sannix PP-1000, product of Sanyo Chemical Industries) was used in lieu of the glycerol-propylene oxide adduct with a molecular weight of 1,000, and that propylene oxide and tris(pentafluorophenyl)borane were used in an amount of 87.1 g and 0.0009 g, to give 169.0 g of liquid-form polyoxypropylene glycol (molecular weight: 2,000). The yield was 97%. The polyoxypropylenetriol obtained had a hydroxyl value of 55.9.

The proportion of terminal primary hydroxyl groups was determined by the $^1$H-NMR method described hereinabove and found to be 72%.

EXAMPLE 6

A 200-ml SUS autoclave equipped with a stirrer and temperature control device was charged with 139 g of propylene dithiocarbonate and 8.79 g of tris(pentafluorophenyl)borane, and the reaction was carried out at a reaction temperature of 120° C. for 12 hours. The mixture was then matured at 120° C. for 6 hours. The reaction mixture was poured into 500 g of n-hexane, whereupon poly propylene dithiocarbonate) precipitated. This precipitate was filtered off, whereby 109 g of poly propylene dithiocarbonate) was obtained. The yield was 81% as calculated based on the weight of propylene dithiocarbonate charged. The thus-obtained poly propylene dithiocarbonate) had a molecular weight of 18,500.

Comparative Example 1

Using 0.63 g of potassium hydroxide in lieu of tris(pentafluorophenyl)borane, to the same reaction apparatus as used in Example 1 was added dropwise 110.1 g of propylene oxide over 12 hours at a reaction temperature of 120–130° C. The mixture was then matured at 120° C. for 6 hours. Then, 3.0 g of synthetic silicate salt (Kyowaad 600, product of Kyowa Chemical) and 2 g of water were added and the mixture was treated at 60° C. for 3 hours. The mixture was taken out of the autoclave, filtered through a 1-micron filter and then dehydrated to give 161.3 g of liquid-form polyoxypropylenetriol (molecular weight: 3000). The yield was 97%. The thus-obtained polyoxypropylenetriol had a hydroxyl value of 56.1.

The results of $^1$H-NMR chemical shift measurement in terms of δ values of the polyoxypropylenetriol obtained (solvent: CDCl$_3$) are shown below.

$^1$H-NMR, δ values: 1.11 (s, 150.4H), 2.5 (s, 3H), 3.20–3.79 (m, 155.9H)

The proportion of terminal primary hydroxyl groups was determined by the $^1$H-NMR method described hereinabove and found to be 2%.

The measurement results for $^1$H-NMR chemical shift δ values (solvent; CDCl$_3$) as obtained on that occasion are shown below.

$^1$H-NMR, δ values: 1.13 (s, 150.4H), 3.38–3.83 (m, 155.4H), 4.20–4.34 (m, 0.1H), 5.16–5.30 (m, 2.9H)

Comparative Example 2

The procedure of Example 6 was followed in the same manner except that 2.4 g of BF$_3$ etherate was used in lieu of tris(pentafluorophenyl)borane, to give 54 g of poly propylene dithiocarbonate). The yield was 59% as calculated based on the weight of propylene dithiocarbonate charged. The thus-obtained poly (propylene dithiocarbonate) had a molecular weight of 16,700.

Production Example 1

A mixture was prepared by uniformly mixing 439.9 g of the polyoxypropylenetriol (molecular weight: 3,000) obtained in Example 1, 219.2 g of tolylene diisocyanate, 18.7 g of water, 0.57 g of stannous octoate, 5.26 g of dioctyl phthalate, 5.3 g of polyoxypropylene glycol (molecular weight: 2,000), 0.33 g of triethylenediamine, 2.2 g of N-methylmorpholine and 6.6 g of foam modifier (L-520, product of Nippon Unicar). This mixture was poured uniformly into a vessel (30 cm×30 cm) and allowed to expand to give a urethane foam.

As for the foaming behavior on that occasion, the 100% rise time was 1 minute. The viscosity at the time of foaming was checked by means of a vibration viscometer. It was found that the viscosity of the foaming resin arrived at 100,000 cps in 40 seconds after mixing.

Comparative Production Example 1

A urethane foam was produced in the same manner as in Production Example 1 except that 934.9 g of the polyoxypropylenetriol (molecular weight: 3,000) produced in Comparative Example 1 was used in lieu of the polyoxypropylenetriol (molecular weight: 3,000) produced in Example 1.

As for the foaming behavior on that occasion, the 100% rise time was 3 minutes. The viscosity at the time of foaming was checked by means of a vibration viscometer. It was found that the viscosity of the foaming resin arrived at 100,000 cps in 60 seconds after mixing.

Production Example 2

A 500-ml four-necked flask equipped with a stirrer and a temperature control device was charged with 115.2 g of 4,4'-diphenylmethanediisocyanate, 264.9 g of the polypropylene glycol (molecular weight: 2,000) obtained in Example 5 and 20.9 g of ethylene glycol, and the reaction was carried out at 68° C. for 5 hours to give a polyurethane elastomer. During the reaction, the percent reaction (percent consumption) of the isocyanato groups was 72% after 1 hour, 93% after 2 hours and 100 after 2.5 hours.

The weight average molecular weight, number average molecular weight (as determined by gel permeation chromatography), tensile strength at break and elongation at break of the polyurethane elastomer obtained are shown in Table 1.

Comparative Production Example 2

A polyurethane elastomer was produced in the same manner as in Production Example 2 except that polypropylene glycol with a molecular weight of 2,000 (Sannix PP-2000, product of Sanyo Chemical Industries; hydroxyl value: 55.9; proportion of terminal primary hydroxyl groups: 2% was used in lieu of 269.9 g of the polypropylene glycol (molecular weight: 2,000) obtained in Example 5.

During the reaction, the percent reaction (percent consumption) of the isocyanato groups was 49% after 1 hour, 79% after 2 hours, 93% after 3 hours, 98% after 4 hours and 100% after 5 hours.

The molecular weights, tensile strength at break and elongation at break of the polyurethane elastomer obtained are shown in Table 1.

TABLE 1

|  | Ex. 2 | Compar. Ex. 2 |
|---|---|---|
| Weight average molecular weight | 210,000 | 170,000 |
| Number average molecular weight | 91,000 | 74,000 |
| Tensile strength at break (kg/cm$^2$) | 437 | 286 |
| Elongation at break (%) | 760 | 750 |

As is evident from comparison between Examples 1 and 2 and Comparative Examples 1 and 2, the polyoxyalkylene polyols (I) of the present invention have higher reactivity with isocyanato groups, as compared with the conventional polyoxyalkylene polyols.

Further, as shown in Table 1, the polyurethane elastomers derived from the polyoxyalkylene polyols (I) of the present invention have excellent physical resin characteristics, namely they have higher molecular weight, and higher tensile strength at break, though equivalent in elongation at break, as compared with the comparative examples.

INDUSTRIAL APPLICABILITY

According to the present invention, ring-opening polymerization products can be produced from heterocyclic compounds in good yields. In particular when alkylene oxides are subjected to ring-opening polymerization, polyoxyalkylene polyols excellent in reactivity are obtained without impairing their hydrophobicity. By using these polyoxyalkylene polyols as polyol components, it is possible to obtain thermosetting resins having high rates of reaction and excellent in physical resin characteristics (tensile strength, bending strength) and whose physical properties are not deteriorated by moisture.

The polyoxyalkylene polyols and monools of the present invention are useful also as raw materials for the production of textile treatment oils, detergents, antifoaming agents and other surfactant compositions.

What is claimed is:

1. A polyoxyalkylene polyol or monool (I) of the general formula (1) below, wherein greater than 60% of the terminally located hydroxyl-containing groups, namely —AO—H groups, are primary hydroxyl-containing groups of the general formula (2) below as determined by $^1$H-NMR measurement;

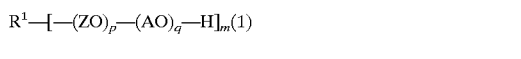  (1)

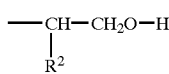  (2)

wherein:
   in the formula (1), R$^1$ is a group having a valence of m as derived from a compound selected from the group consisting of water, an alcohol compound, a phenol compound, an amino-containing compound, a carboxyl-containing compound, a thiol-containing compound and a phosphoric acid compound by removal of its active hydrogen atom or atoms; Z is an alkylene group containing 2 to 12 carbon atoms or a cycloalkylene group containing 6 to 12 carbon atoms, each of which may contain at least one halogen atom or aryl group or both as substituents; A is an alkylene group containing 3 to 12 carbon atoms or a cycloalkylene group containing 6 to 12 carbon atoms, each of which may contain at least one halogen atom or aryl group or both as substituents; m is an integer of 1 or 2 to 100; p is an integer of 1 or more when m is an integer of 1, or an integer of 0 or 1 or more when m is an integer of 2 to 100 and q is an integer of 1 or more, p+q being equal to 1 to 200; and in the formula (2), R$^2$ is an alkyl group containing 1 to 10 carbon atoms or an aryl group containing 6 or 10 carbon atoms, each of which may be substituted by a halogen atom or atoms.

2. The polyoxyalkylene polyol or monool (I) according to claim 1, wherein R$^1$ is a group derived from water, an alcohol compound or an amino-containing compound by removal of its active hydrogen atom or atoms.

3. The polyoxyalkylene polyol or monool (I) according to claim 1 wherein not less than 72% of the terminally located hydroxyl-containing groups, namely —AO—H groups, are primary hydroxyl-containing groups of the general formula (2), as determined by $^1$H-NMR measurement.

4. A polyol composition (III) which comprises a polyoxyalkylene polyol or monool (I) according to claim 1.

5. The polyol composition (III) according to claim 4, which is intended for use as a polyol composition for producing thermosetting resins.

6. The polyol composition (III) according to claim 5, wherein said thermosetting resins are polyurethane resins.

7. The polyol composition (III) according to claim 4, which is intended for use as a polyol composition for producing surfactants.

8. A method of producing ring-opening polymerization products, which comprises subjecting a heterocyclic compound (d) of the general formula (5) below to ring-opening addition polymerization with an active hydrogen-containing compound (b) of the general formula (3) below in the presence of at least one catalyst (c) selected from the group consisting of compounds having the general formula (4-1) below, compounds of the general formula (4-2) below and compounds of the general formula (4-3) below:

  (3)

  (4-1)

  (4-2)

  (4-3)

  (5)

wherein
   in the formula (3), R$^1$ is a group having a valence of m as derived from a compound selected from the group consisting of water, alcohol compound, a phenol compound, an amino-containing compound, a carboxyl-containing compound, a thiol-containing compound and a phosphoric acid compound by removal of its active hydrogen atom or atoms; Z is an alkylene group containing 2 to 12 carbon atoms or a cycloalkylene group containing 6 to 12 carbon atoms, each of which may contain at least one halogen atom or aryl group or both as substituents; m is an integer of 1 or 2 to 100; and p is an integer of 0 or 1 to 199;

in each of formulae (4-1), (4-2) and (4-3), X represents a boron atom or aluminum atom; F represents a fluorine atom; and $R^3$ represents a substituted or unsubstituted phenyl group of the general formula (6) below and/or a tertiary alkyl group of the general formula (7) below:

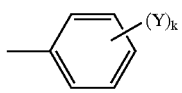

(6)

wherein Y represents a hydrogen atom, an alkyl group containing 1 to 4 carbon atoms, a halogen atom, a vitro group or a cyano group; and k represents an integer of 0 to 5, provided that when k is 2 or more, a plurality of Y groups may be the same or different;

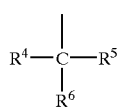

(7)

wherein $R^4$, $R^5$ and $R^6$ each independently represents an alkyl group containing 1 to 4 carbon atoms and when there are a plurality of $R^3$ groups, they may be the same or different; and in the formula (5), R is an alkylene group containing 3 to 12 carbon atoms, which may contain at least one halogen atom or aryl group or both as substituents; Q is a divalent organic group selected from the group consisting of —O—, —S—, —NH—, —O(CO)O—, S(CO)O—, —O(CS)O—, —O(CO)S—, —O(CS)S—, —S(CS)O—, —S(CO)S—, —S(CS)S—, —COO—, —CSO—, —COS—, —CSS—, —CONH—and —N=C(—$R^7$)—O— in which $R^7$ represents an alkyl group containing 1 to 12 carbon atoms, a cycloaclyl group containing 3 to 12 carbon atoms, which may be substituated by an alkyl group, or an aryl group containing 6 to 12 carbon atoms, which may be substituated by a halogen atom or atoms.

9. The production method according to claim 8, wherein, in the formula (5) representing a heterocyclic compound (d), Q is —O—and R is a divalent hydrocarbon group of the formula (8) below:

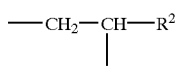

(8)

wherein $R^2$ represents a monovalent hydrocarbon group containing 1 to 10 carbon atoms, which may be substituted by a halogen atom or atoms.

10. The production method according to claim 9, for producing the ring-opening polymerization product in which not less than 40% of the terminal hydroxyl groups are primary hydroxyl groups.

11. The production method according to claim 9, for producing the ring-opening polymerization product in which not less than 60% of the terminal hydroxyl groups are primary hydroxyl groups.

12. A ring-opening polymerization product obtained by the production method according to claim 8,
wherein not less than 60% of the terminally located hydroxyl-containing groups are primary hydroxyl-containing groups of the general formula (2) as determined by $^1$H-NMR measurement;

—CH(—$R^2$)—CH$_2$OH (2)

in the formula, $R^2$ is an alkyl group containing 1 to 10 carbon atoms or an aryl group containing 6 to 10 carbon atoms, each of which is optionally substituted by a halogen atom or atoms.

13. A polyol composition (II) for producing thermosetting resins, which comprises a ring-opening polymerization product prepared by the production method according to claim 9.

14. The polyol composition (II) according to claim 13, intended for use in polyurethane resin production.

15. A method of producing polyurethane resins by reacting a polyol component and a polyisocyanate (e), wherein said polyol component is the polyol composition (II) according to claim 14.

16. A polyurethane resin obtained by reacting a polyol component and a polyisocyanate (e), wherein said polyol component is the polyol composition (III) according to claim 6.

17. A polyol composition (III) which comprises a polyoxyalkylene polyol or monool (I) according to claim 2.

18. A polyol composition (III) which comprises a polyoxyalkylene polyol or monool (I) according to claim 3.

19. A polyol composition (II) for producing thermosetting resins, which comprises a ring-opening polymerization product prepared by the production method according to claim 10.

* * * * *

UNITED STATES PATENT AND TRADEMARK OFFICE
CERTIFICATE OF CORRECTION

PATENT NO.   : 6,531,566 B1
DATED        : March 11, 2003
INVENTOR(S)  : Munekazu Satake It is certified that error appears in the above-identified patent and that said Letters Patent is hereby corrected as shown below:

Column 17,
Line 22, replace the word "vitro" with -- "nitro" --.

Signed and Sealed this

Ninth Day of September, 2003

JAMES E. ROGAN
*Director of the United States Patent and Trademark Office*

UNITED STATES PATENT AND TRADEMARK OFFICE
CERTIFICATE OF CORRECTION

PATENT NO. : 6,531,566 B1
DATED : March 11, 2003
INVENTOR(S) : Munekazu Satake

It is certified that error appears in the above-identified patent and that said Letters Patent is hereby corrected as shown below:

Column 15,
Formula (1) should appear as follows:
$$R^1\text{-}[\text{-}(ZO)_p\text{-}(AO)_q\text{-}H]_m \quad (1)$$

Signed and Sealed this

Eighteenth Day of November, 2003

JAMES E. ROGAN
*Director of the United States Patent and Trademark Office*

UNITED STATES PATENT AND TRADEMARK OFFICE
CERTIFICATE OF CORRECTION

PATENT NO. : 6,531,566 B1
DATED : March 11, 2003
INVENTOR(S) : Munekazu Satake

It is certified that error appears in the above-identified patent and that said Letters Patent is hereby corrected as shown below:

Column 16,
Line 51, replace the following formula:
"$X\text{-}(\text{-}R^3)_2$" with the following -- $X\text{-}(\text{-}R^3)_3$ --; and Column 17,
Line 46, replace the word "cycloaclyl" with -- cycloalkyl --.

Signed and Sealed this

Twenty-second Day of June, 2004

JON W. DUDAS
*Acting Director of the United States Patent and Trademark Office*